United States Patent
Breuer et al.

(10) Patent No.: US 9,359,935 B2
(45) Date of Patent: Jun. 7, 2016

(54) SPARK-IGNITION INTERNAL COMBUSTION ENGINE HAVING WALL PORTION SEPARATING AT LEAST THE TWO CYLINDERS

(71) Applicant: Ford Global Technologies, LLC, Dearborn, MI (US)

(72) Inventors: Albert Breuer, Cologne (DE); Moritz Klaus Springer, Hagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 13/868,798

(22) Filed: Apr. 23, 2013

(65) Prior Publication Data

US 2013/0276754 A1 Oct. 24, 2013

(30) Foreign Application Priority Data

Apr. 23, 2012 (EP) .................................... 12165107

(51) Int. Cl.
*F02B 33/00* (2006.01)
*F01N 13/08* (2010.01)
(Continued)

(52) U.S. Cl.
CPC ................ *F02B 33/00* (2013.01); *F01N 13/08* (2013.01); *F02B 1/12* (2013.01); *F02B 3/04* (2013.01); *F02D 41/006* (2013.01);
(Continued)

(58) Field of Classification Search
CPC . F02B 33/00; F01N 2410/00; F01N 2390/00; F01N 2470/00; F01N 2470/08; F01N 2470/14; F01N 2470/16; F01N 2470/30; F01N 13/06; F01N 13/08; F01N 13/082; F01N 13/085; F01N 13/087; F01N 13/10; F01N 13/102; F01N 13/105; F01N 13/107
USPC ................... 123/65 EM, 568.11; 60/323, 694
See application file for complete search history.

(56) References Cited

U.S. PATENT DOCUMENTS 609,250 A * 8/1898 Tesla ...................... F02P 3/0884
123/604
2,643,275 A * 6/1953 Saunders ................ H01T 13/24
123/146.5 A (Continued)

FOREIGN PATENT DOCUMENTS

JP H11210441 A 8/1999

OTHER PUBLICATIONS

Breuer, Albert, et al., "Method for Operating a Spark Ignition Internal Combustion Engine Having at Least Two Cylinders," U.S. Appl. No. 13/868,818, filed Apr. 23, 2013, 37 pages.

*Primary Examiner* — Stephen K Cronin
*Assistant Examiner* — Kevin R Steckbauer
(74) *Attorney, Agent, or Firm* — Julia Voutyras; Alleman Hall McCoy Russell & Tuttle LLP (57) ABSTRACT

The application relates to spark initiation under varied air-charge density and composition. An engine is disclosed comprising at least two cylinders with spark plugs therein; an integrated exhaust manifold, the integrated exhaust manifold having a wall portion and an adjustable shutoff element within the wall portion wherein the wall portion divides exhaust pipes of the at least two cylinders and the adjustable shutoff element allows exhaust gas from a first cylinder into an exhaust pipe of an adjacent cylinder. Hot exhaust gas may be taken into an adjacent cylinder serving as ignition gas and allowing the engine of the present disclosure to undergo spark ignition at low loads, or autoignition at high loads.

19 Claims, 7 Drawing Sheets

(51) Int. Cl.
  *F02B 1/12* (2006.01)
  *F02B 3/04* (2006.01)
  *F02F 1/42* (2006.01)
  *F02M 25/07* (2006.01)
  *F02D 41/00* (2006.01)
  *F02D 41/30* (2006.01)

(52) U.S. Cl.
  CPC ......... *F02F 1/4264* (2013.01); *F02M 25/0747* (2013.01); *F02M 25/0749* (2013.01); *F02M 25/0793* (2013.01); *F02M 26/43* (2016.02); *F01N 2390/00* (2013.01); *F01N 2470/00* (2013.01); *F01N 2470/08* (2013.01); *F02D 2041/3052* (2013.01); *Y02T 10/47* (2013.01)

(56) References Cited

U.S. PATENT DOCUMENTS

| | | | | |
|---|---|---|---|---|
| 4,116,051 A * | 9/1978 | Laib | ............ | G07C 5/006 374/E3.004 |
| 5,134,850 A * | 8/1992 | Saito | ............ | F01L 1/34406 123/90.16 |
| 6,932,062 B2 * | 8/2005 | Kuzuyama | ............ | F02D 9/04 123/568.13 |
| 6,941,905 B2 * | 9/2005 | Hitomi | ............ | F02D 9/04 123/568.11 |
| 7,159,581 B2 * | 1/2007 | Pagot | ............ | F01L 9/00 123/568.13 |
| 7,509,800 B2 * | 3/2009 | I | ............ | F01N 3/101 60/278 |
| 7,640,728 B2 * | 1/2010 | Yoshizaki | ............ | B01D 53/9431 60/286 |
| 7,703,574 B2 * | 4/2010 | Kruger | ............ | F01N 13/02 181/253 |
| 8,056,337 B2 * | 11/2011 | Hokuto | ............ | F01N 3/0885 123/528 |
| 8,209,980 B2 * | 7/2012 | Takagawa | ............ | F01N 3/2006 123/193.5 |
| 8,919,303 B2 * | 12/2014 | Shishime | ............ | F02D 13/02 123/48 R |
| 8,966,886 B2 * | 3/2015 | Nakamura | ............ | F01N 3/00 60/312 |
| 9,062,598 B2 * | 6/2015 | Inoue | ............ | F02M 25/0751 |
| 9,239,021 B2 * | 1/2016 | Moroi | ............ | F02D 23/02 |
| 2004/0060527 A1 * | 4/2004 | Hitomi | ............ | F02D 9/04 123/58.8 |
| 2005/0066920 A1 * | 3/2005 | Daigo | ............ | F01L 1/267 123/90.16 |
| 2005/0217648 A1 * | 10/2005 | Pagot | ............ | F01L 9/00 123/568.14 |
| 2005/0252464 A1 * | 11/2005 | Aikawa | ............ | F02B 77/085 123/58.8 |
| 2009/0013969 A1 | 1/2009 | Winstead | | |
| 2009/0199813 A1 * | 8/2009 | Kuzuyama | ............ | F02B 1/12 123/27 R |
| 2010/0011762 A1 * | 1/2010 | Hokuto | ............ | F01N 3/0885 60/602 |
| 2011/0131978 A1 * | 6/2011 | Okada | ............ | F01N 3/2053 60/602 |
| 2013/0104840 A1 * | 5/2013 | Inoue | ............ | F02M 25/0751 123/294 |
| 2013/0152901 A1 * | 6/2013 | Shishime | ............ | F02D 13/02 123/48 R |
| 2014/0060493 A1 * | 3/2014 | Iwai | ............ | F02B 23/101 123/478 |

* cited by examiner

FIG. 7

SPARK-IGNITION INTERNAL COMBUSTION ENGINE HAVING WALL PORTION SEPARATING AT LEAST THE TWO CYLINDERS

CROSS REFERENCE TO RELATED APPLICATIONS

The present application claims priority to European Patent Application No. 12165107.9, filed on Apr. 23, 2012, the entire contents of which are hereby incorporated by reference for all purposes.

TECHNICAL FIELD

The application relates to ignition initiation in spark ignition engines.

BACKGROUND AND SUMMARY

In a spark-ignition engine the load is generally controlled by a throttle valve provided in an intake tract. By adjusting the throttle valve it is possible to reduce the pressure of the intake air downstream of the throttle valve to a greater or lesser degree. In this way it is possible, for a constant combustion chamber volume, to adjust the air mass, that is to say the quantity of air, via the pressure of the intake air. Low loads use heavier throttling, that is to say extensive pressure reduction in the intake tract, so that large charge cycle losses have to be accepted, particularly in the partial-load range. In this respect the fuel-air mixture in the cylinder has a lower density at low loads than at higher loads.

The load-dependent variation of the aircharge density can present problems when initiating the spark-ignition. In order to ensure reliable ignition of the fuel-air mixture at low loads, that is to say with a less dense mixture, the electrodes of the spark plug may have a relatively large gap, in order to form, that is to say to provide, a large spark path for the ignition spark. A large electrode gap uses a high ignition voltage.

If the fuel-air mixture then becomes denser as the load increases, the voltage used in order to initiate reliable ignition is also increased, since the denser fuel-air mixture present between the electrodes has an insulating effect on the crossing of the ignition spark from one electrode to the other.

The high ignition voltage used can damage the spark plug itself and/or other components, in particular current supply components carrying a high voltage, that is to say components of the electrical system of the motor vehicle. In the event of an excessive ignition voltage demand, arcing may occur between the high-voltage leads and the chassis ground. No ignition spark is formed between the electrodes and misfiring occurs.

Besides the density of the mixture, the air/fuel ratio $\lambda$ also has an influence on the initiation of the spark-ignition, in particular, however, on the combustion induced by ignition sparks.

The fuel-air mixture of a spark-ignition engine can be enriched or made leaner as a function of the instantaneous load T prevailing, an enrichment preferably being undertaken, that is to say the air/fuel ratio $\lambda$ being reduced, as the load increases.

Enrichment ($\lambda<1$) frequently ensues whenever high exhaust gas temperatures are to be anticipated, that is to say at high loads, in order to prevent a thermal overload of individual components of the internal combustion engine. This is done by injecting more fuel than can be burned with the quantity of air delivered, the excess fuel likewise being heated and vaporized, so that the temperature of the combustion gases falls. This approach is to be regarded as disadvantageous from various energy standpoints, particularly with regard to the fuel consumption of the internal combustion engine, and with regard to the pollutant emissions, but is recognized as admissible and practical.

Making the fuel-air mixture leaner as the load diminishes is a measure aimed at dethrottling of the internal combustion engine, less fuel being injected than could be burned with the quantity of air delivered, that is to say more fresh air is introduced into the cylinders than is necessary for combustion of the fuel introduced, thereby diluting the mixture. These variations in aircharge density and content may make spark initiation difficult.

The inventors have recognized the above mentioned problems and herein disclose a spark ignition engine capable of initiating combustion via auto-ignition when it is advantageous. In the internal combustion engine according to the disclosure account is taken of the various load-specific demands of the spark plug in that the ignition of the fuel-air mixture is initiated either by spark-ignition or by auto-ignition—preferably as a function of load, T. In order to initiate auto-ignition, exhaust gas discharged from one cylinder into the exhaust discharge system, is introduced into another cylinder, in order to induce auto-ignition by this ignition gas.

To allow for the crosstalk of hot exhaust gas into an adjacent cylinder a port, controllable by a shutoff element, is provided in a dividing wall portion of an integrated exhaust manifold. The wall portion divides the exhaust pipes of the two cylinders—preferably adjacent in the firing order—from one another over a limited distance. The port therein allows the transfer of exhaust gas from one cylinder into an adjacent cylinder. With the port opened, exhaust gas, serving as ignition gas, is introduced into the other cylinder via the exhaust discharge system and the opened port.

The present application relates to ignition initiation under varied aircharge density and composition. An engine is disclosed comprising at least two cylinders with spark plugs therein; an integrated exhaust manifold, the integrated exhaust manifold having a wall portion and an adjustable shutoff element within the wall portion wherein the wall portion divides exhaust pipes of the at least two cylinders and the adjustable shutoff element allows exhaust gas from a first cylinder into an exhaust pipe of an adjacent cylinder. Hot exhaust gas may be taken into an adjacent cylinder serving as ignition gas and allowing the engine of the present disclosure to undergo spark ignition at low loads, or autoignition at high loads.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

Figure 1:
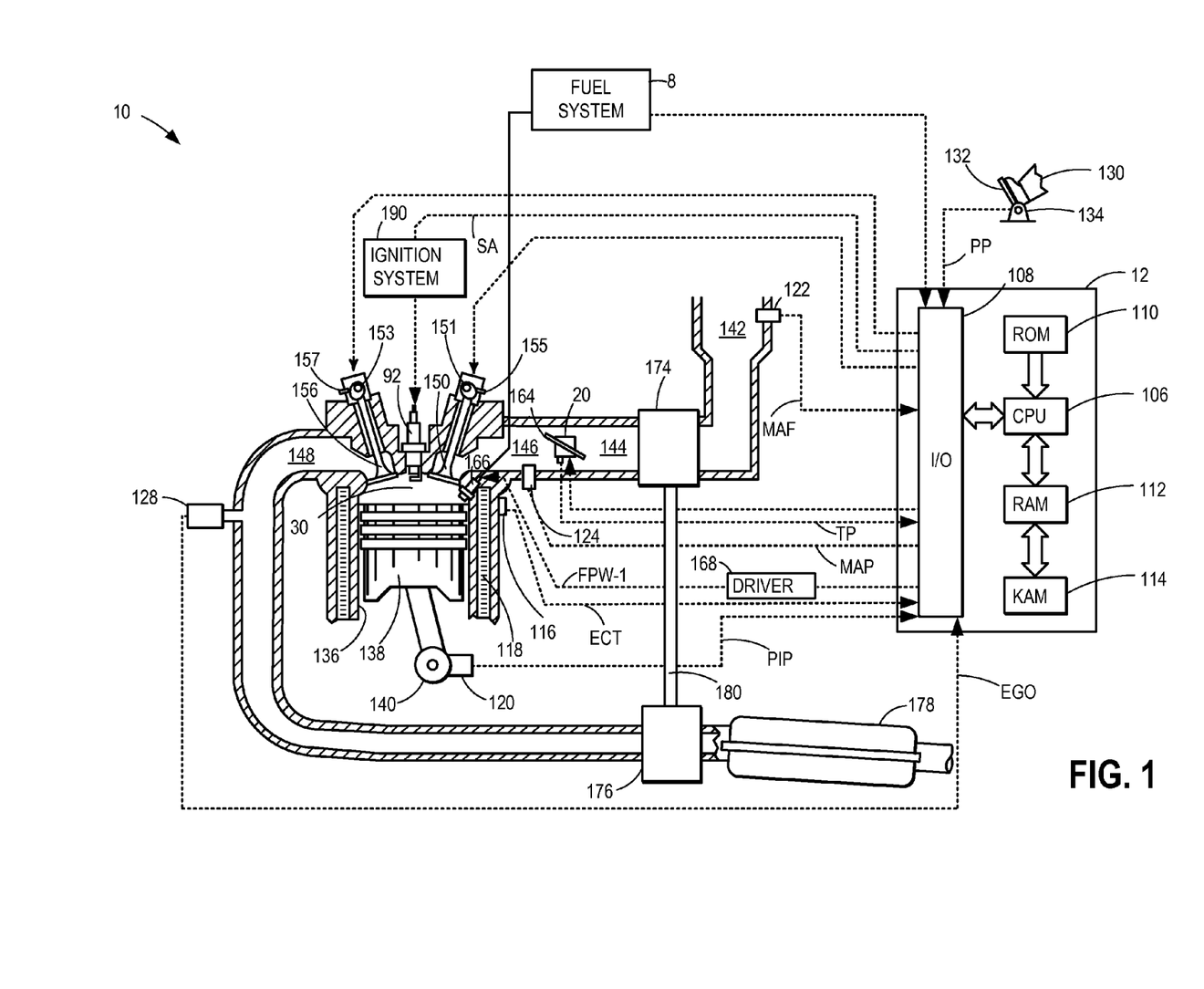
FIG. 1 shows an example cylinder of an engine.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 may communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 92 for initiating combustion. Ignition system 190 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 92. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 1 shows only one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Figure 2:
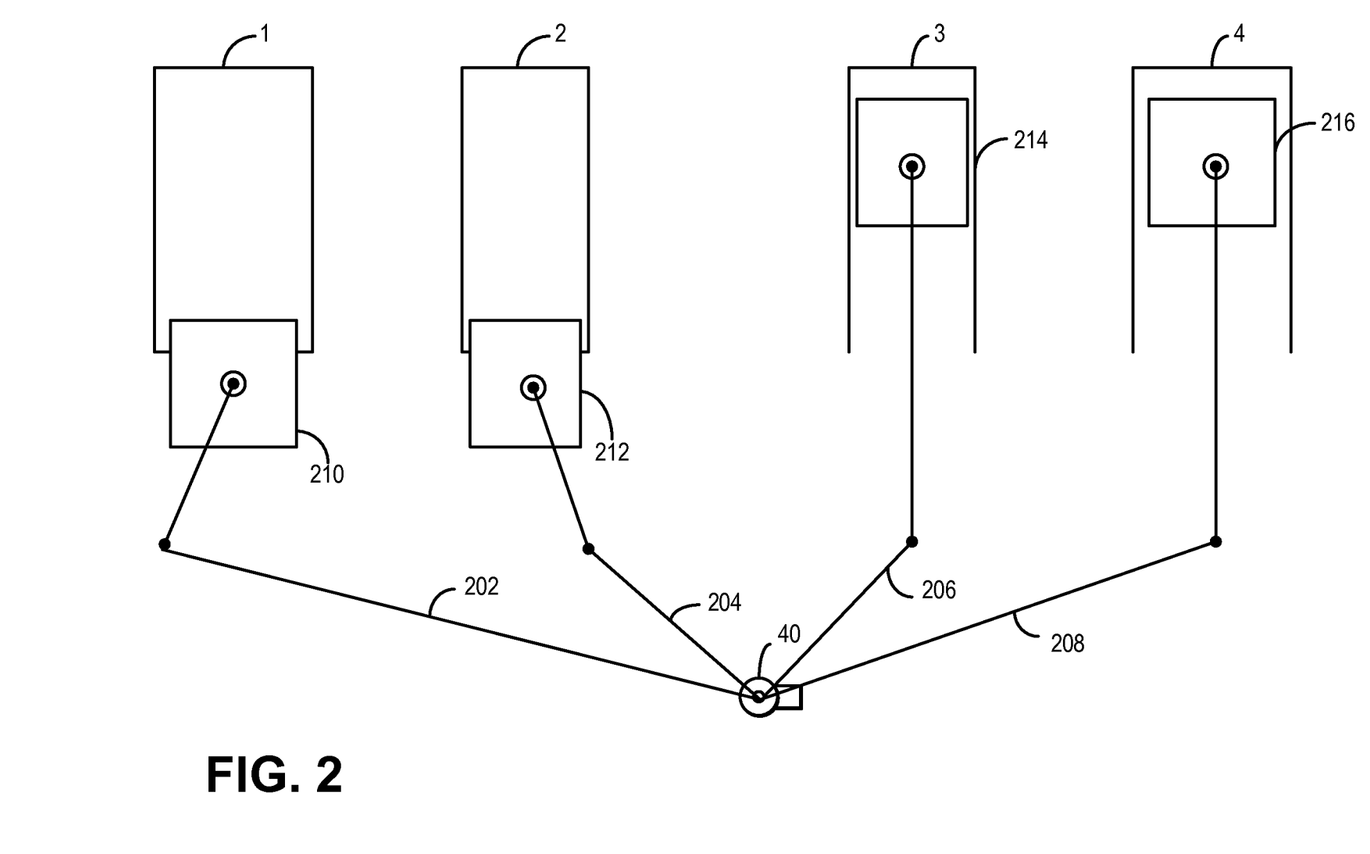
FIG. 2 shows an example four cylinder, in-line engine.

Turning to FIG. 2, four cylinders 1, 2, 3, 4 of a four-cylinder in-line engine are shown. Each cylinder may be coupled to a common crankshaft through a connecting rod, connecting rods 202, 204, 206, and 208, may couple cylinders 1, 2, 3, and 4 respectively, to crankshaft 40.

In the snapshot shown, the pistons 210, 212 of the first and second cylinders 1, 2 are situated at bottom dead center, and the pistons 214, 216 of the third and fourth cylinders 3, 4 are situated at top dead center.

According to the present disclosure as the cylinders fire in a 1-3-4-2 order. Under high loads, a pivot gate (described below in reference to FIG. 3) is adjusted so that exhaust gases may crosstalk between the cylinders preceding in firing order, e.g. cylinder 2, during their exhaust stroke and the cylinders succeeding in firing order, i.e. cylinder 1 in this example, during their expansion stroke. In this way, crosstalk of exhaust gases from a following cylinder into a preceding cylinder in a firing order is facilitated to aid in autoignition.

Auto-ignition in these cylinders may be further facilitated by adjusting valve timing conferring positive valve overlap such that cylinders receive or retain more of their own hot exhaust gases to increase the temperature and pressure of the combustion chamber.

Figure 3:
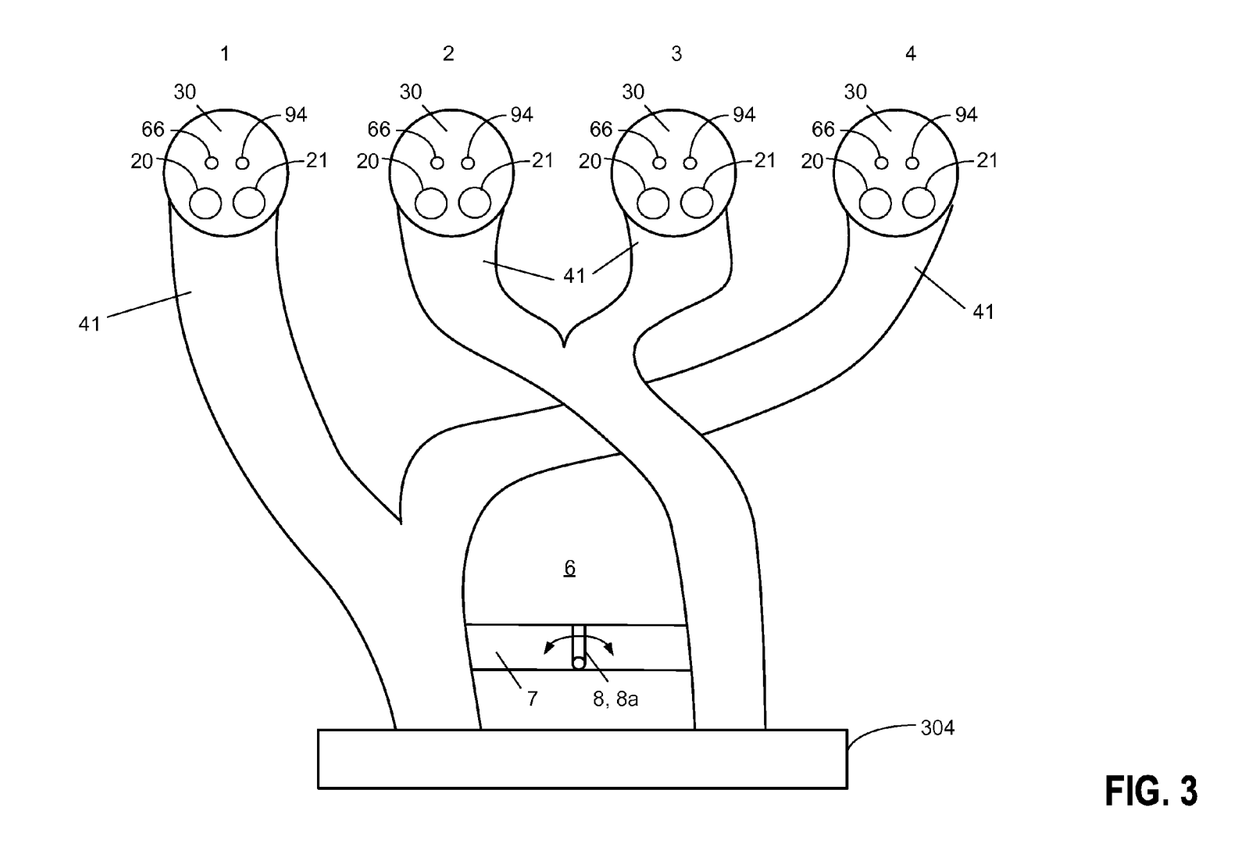
FIG. 3 schematically shows an example exhaust manifold for four cylinders.

Turning now to FIG. 3 an exhaust manifold of one embodiment of the spark-ignition internal combustion engine is shown. Each cylinder 30 comprises two exhaust ports 20, 21 for discharging the exhaust gases via the exhaust discharge system, to which ports the exhaust pipes 41 are joined.

The exhaust pipes 41 of cylinders 2 and 3 join and the exhaust pipes of cylinders 1 and 4 join. The two joined exhaust pipes converge latest at turbocharger 304. Turbocharger 304 may be a twin scroll turbocharger with separate inlets for the two component exhaust pipes or the exhaust pipes may merge prior to the turbocharger inlet. It should be appreciated that in an alternate example the exhaust pipes may also merge and no turbocharged may be present or a supercharger may be used to compress intake air independent of a turbine in the exhaust system. The cylinder head and exhaust manifold may be in fluidic communication with exhaust passage 48 (shown in FIG. 1). Furthermore, the exhaust manifold may comprise and integrated exhaust manifold and shown components may be largely integrated into a cylinder head.

A wall portion 6, projects into the exhaust discharge system, separating the exhaust pipes 41 of adjacent cylinders from one another over a segment of the exhaust discharge system starting from the exhaust ports 20, 21 of the cylinders 30. The exhaust manifold joins exhaust from cylinders with great angular ignition spacing, and separates exhaust from cylinders with small angular ignition spacing, i.e. joins 2 and 3, and separately joins 1 and 4. The separate exhaust pipes 41 from these two mergers extend and may enter a twin scroll turbine, or may further merge. The exhaust manifold may receive engine coolant flow to cool the cylinder head. The engine may be boosted with a turbocharger in some examples, the turbine of the turbocharger coupled to a combined exhaust manifold outlet in the cylinder head.

Ports 7, which are equipped with an adjustable shutoff element 8 in the form of a pivot gate 8a, are provided in the wall portion 6. The port 7 is either opened or closed by the pivoting of the gate 8a, so as to allow a transfer of exhaust gas. Via the ports 7, exhaust crosstalk may be facilitated between cylinders with small angular ignition spacing, i.e. cylinders succeeding in firing order, that is to say from cylinder 1 to 2, from 2 to 4, from 4 to 3 and from 3 to 1. There is no cross-talk in the opposite direction because when, as an example, the exhaust valves of cylinder 2 open then cylinder 1 is in ignition TDC and all valves are closed.

In addition to ports in the exhaust manifold, variances to valve timing may further facilitate exhaust crosstalk. The timing of an intake valve 66, 94 may be changed as may the timing of an exhaust valve. In some embodiments, both intake and exhaust valve timing may be altered. Greater valve overlap may facilitate more exhaust crosstalk, for example. As a non-limiting example, delaying the opening of an exhaust valve (e.g. opening closer to TDC) of an exhaust-gas-supplying cylinder may build pressure in the cylinder such that when the exhaust valve is opened high pressure exhaust may contribute to higher crosstalk.

In the example of a four cylinder in-line engine the wall portion separates the cylinders of a four cylinder in-line engine, the opened element or port may allow exhaust gas from the first cylinder into an exhaust pipe of the adjacent second cylinder, the first cylinder firing immediately after the second cylinder. In the present example, under high loads, positive exhaust valve overlap may be increased and multiple ports within the wall portion may be controlled separately.

Figure 4:
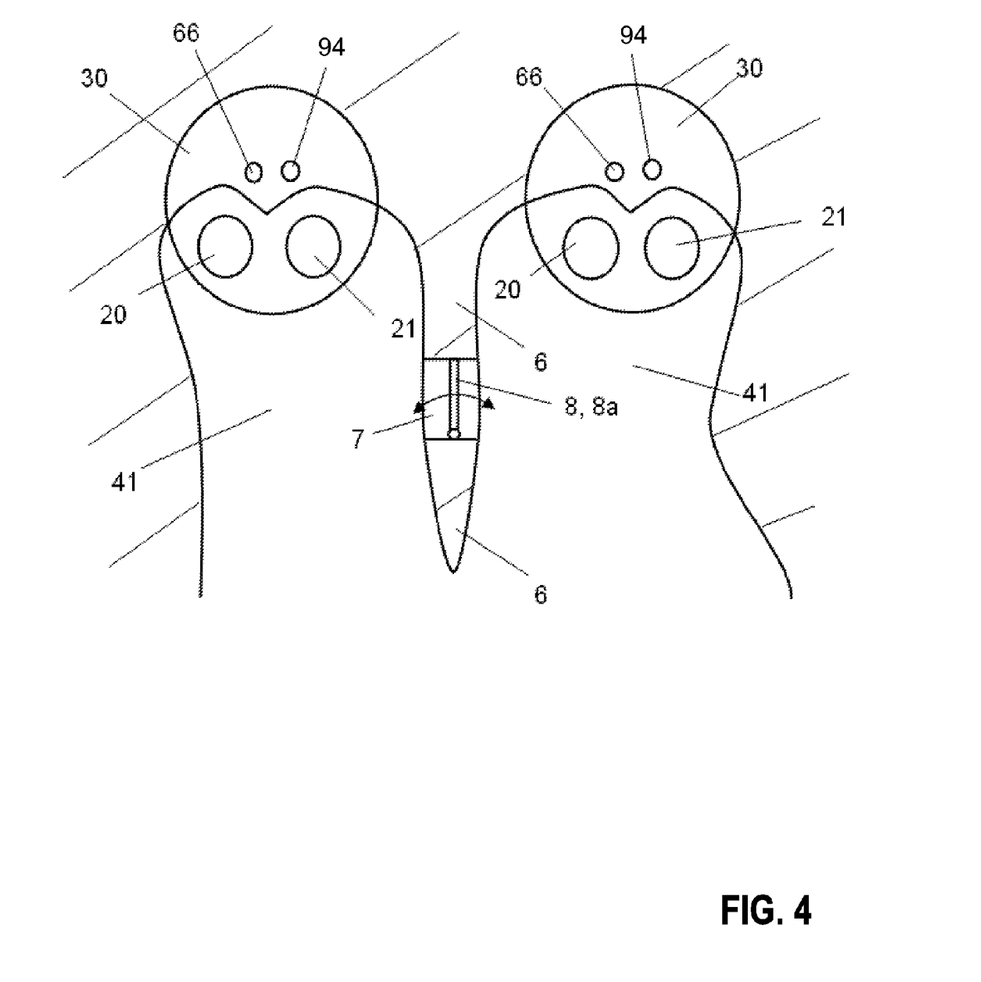
FIG. 4 schematically shows an example exhaust manifold for two cylinders.

Turning now to FIG. 4, an example exhaust manifold for two cylinders is shown. Reference numerals are the same as those in FIG. 3. In the case of two cylinders, a single port 7 exists in the wall portion 6 separating the two cylinders. This port 7 is configured to allow exhaust gas crosstalk between two cylinders as described above.

The wall portion may be of modular design, at least the one cylinder head forming a first segment and the inlet area of the turbine or an external manifold forming a second segment.

In the context of the present disclosure the designation of the cylinders as a first or exhaust-gas-supplying cylinder and adjacent or exhaust-gas-receiving cylinder serves to distinguish between the cylinders. Each of the cylinders may in turn serve as an exhaust-gas-receiving cylinder or exhaust-gas supplying cylinder dependent on powertrain timing.

The exhaust gas transferred from one cylinder into another cylinder is hotter than the exhaust gas returned by exhaust gas recirculation, and in particular is also hotter than the exhaust gas returned by internal exhaust gas recirculation, which by definition originates from the cylinder into which it is internally fed back again. This situation is particularly significant and particularly advantageous in view of the fact that the exhaust gas transferred is used here as ignition gas, since the temperature represents a decisive influencing variable in the initiation of auto-ignition: the higher the temperature of the ignition gas, the more reliable the initiation of auto-ignition.

In advantageous embodiments of the spark-ignition internal combustion engine the exhaust pipes of the first and the second cylinder unite in a common exhaust pipe, forming an integrated exhaust manifold inside at least the one cylinder head.

In designing the exhaust discharge system the aim is to minimize the thermal inertia of the segment of the exhaust pipes between the exhaust port on the cylinder and the exhaust gas after treatment system, which can be achieved by reducing the mass and the length of this segment. It may be practical here to integrate the exhaust manifold as far as possible into the cylinder head.

In the case of internal combustion engines supercharged by exhaust turbochargers, the aim is to arrange the turbine as close as possible to the exhaust, that is to say the exhaust ports of the cylinders, so as to be able in this way to make optimum use of the exhaust gas enthalpy of the hot exhaust gases, which is decisively determined by the exhaust gas pressure and the exhaust gas temperature and to ensure a rapid response of the turbocharger. The thermal inertia and the volume of the pipe system between the exhaust ports of the cylinders and the turbine may also be minimized here, for which reason it is again practical to integrate the exhaust manifold as far as possible into the cylinder head.

It is also increasingly common to integrate the exhaust manifold extensively into the cylinder head in order to benefit from cooling provided in the cylinder head and so that the manifold may not be produced from highly heat-resistant materials, which are cost-intensive. Uniting the exhaust pipes as extensively as possible within the cylinder head leads to a more compact construction, whilst allowing a tighter packaging and moreover affording cost and weight advantages.

However, embodiments of the spark-ignition internal combustion engine in which the wall portion extends up to the outside of at least the one cylinder head may also be advantageous.

Here the exhaust gas flows from at least the two cylinders are separated from one another by the wall portion until they leave the cylinder head, so that the exhaust discharge system emerges from the cylinder head in the shape of at least two outlet orifices. The exhaust pipes of the cylinders or the constituent exhaust pipes are united downstream of the cylinder head and are thereby only brought together in a common exhaust pipe outside the cylinder head.

Embodiments of the spark-ignition internal combustion engine, in which the exhaust pipes of the first cylinder and the second cylinder unite in a common exhaust pipe outside at least the one cylinder head and the wall portion projects beyond the outside of at least the one cylinder head into the exhaust discharge system, may also be advantageous.

According to this embodiment the exhaust gas flows of at least the two cylinders are still separated from one another by the intervening wall portion even after leaving the cylinder head. In this embodiment of the internal combustion engine, also, the exhaust discharge system emerges from the cylinder head in the shape of at least two outlet orifices.

In the case of internal combustion engines supercharged by exhaust-gas turbocharging, in which a twin-scroll turbine is provided, embodiments which are characterized in that the wall portion, which projects into the exhaust discharge system, extends right into the inlet area of the turbine, may be advantageous. The exhaust pipes of at least the two cylinders then unite in a common exhaust pipe in the turbine or downstream of the turbine.

In the case of internal combustion engines supercharged by exhaust-gas turbocharging, in which two turbines are provided, embodiments which are characterized in that a first turbine is arranged in at least the one exhaust pipe of the first cylinder and a second turbine is arranged in at least the one exhaust pipe of the second cylinder may be advantageous, the exhaust pipes of at least the two cylinders uniting in a common exhaust pipe downstream of the two turbines. Here too, the wall portion may extend up to the turbines.

In advantageous embodiments of the spark-ignition internal combustion engine the succeeding cylinder in the firing order serves as exhaust gas-delivering cylinder, which delivers exhaust gas serving as ignition gas, and the cylinder in the firing order serves as exhaust gas-receiving cylinder, into which the ignition gas is introduced.

Two succeeding cylinders in the firing order have minimal offset in terms of their working processes and are therefore advantageous for the transfer of exhaust gas from one cylinder into the other cylinder, that is to say from the succeeding cylinder in the firing order into the preceding cylinder in the firing order.

Figure 5:
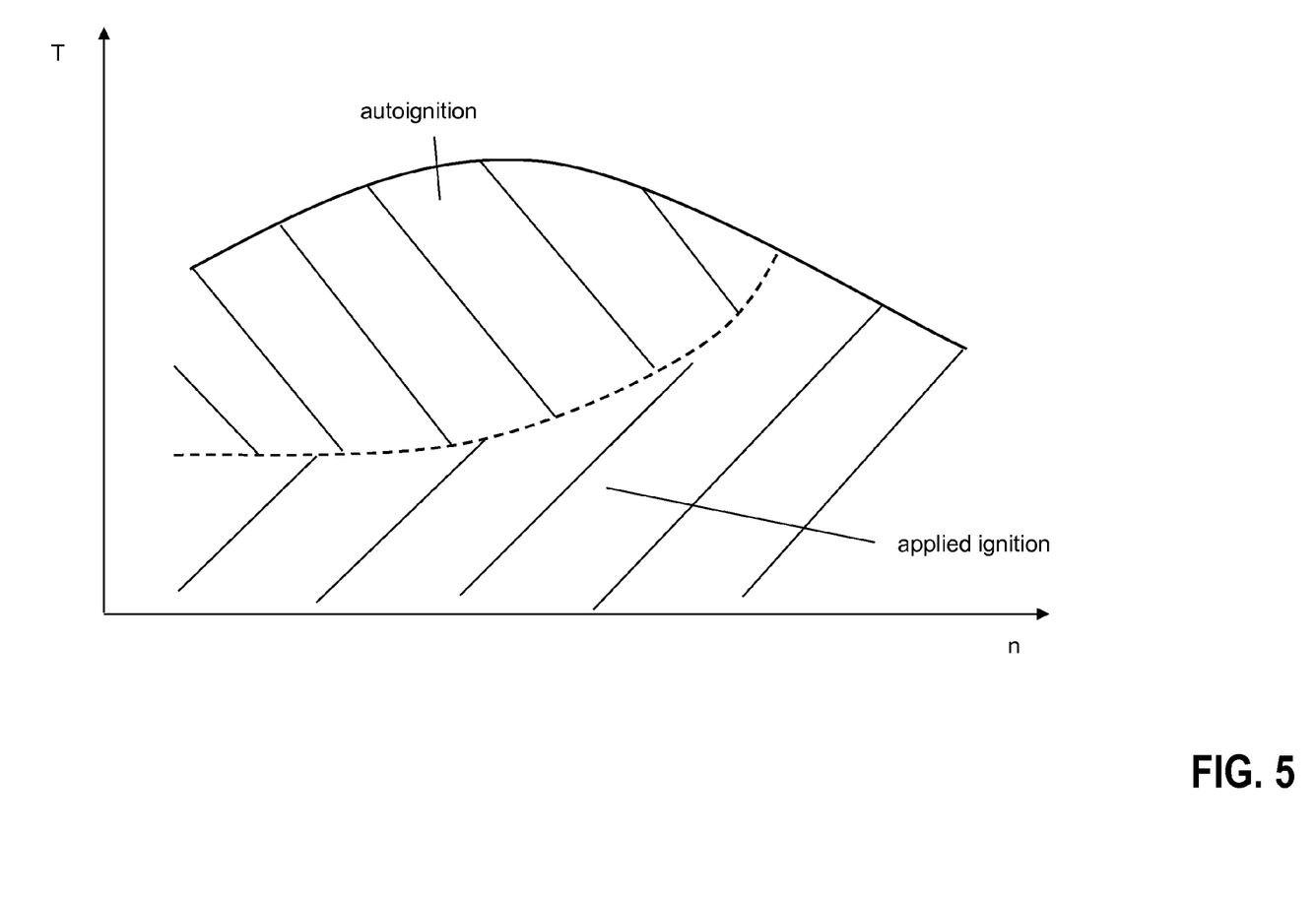
FIG. 5 shows a map of one embodiment of the spark ignition internal combustion engine in schematic form indicating the areas of use of spark ignition and autoignition.

Turning now to FIG. 5 an engine map of one embodiment of the spark ignition internal combustion engine is shown. The map shows the torque (T) and engine speed (n) regions where spark ignition and autoignition may be utilized.

According to the method represented by the map in FIG. 5, autoignition is used at high loads, whereas spark ignition is employed at low loads and toward relatively high engine speeds.

It should be pointed out in this context that loads T are regarded as high particularly when: $T>0.5\ T_{max}$ or $T>0.65\ T_{max}$, $T_{max}$ being the maximal load at the prevailing engine speed n.

Assuming that auto-ignition is activated, it is advantageous when the load falls below a predefined load $T_{threshold}$ to revert to spark-ignition, for which purpose the auto-ignition initiation measures cease, so that auto-ignition is deactivated.

The internal combustion engine according to the disclosure affords advantages particularly at high loads T. A spark plug serving to initiate the spark-ignition can be designed with a large electrode gap, which ensures reliable ignition of a less dense fuel-air mixture at low loads. As the load increases or with a denser mixture there is a transition to an auto-ignition process or the auto-ignition assumes a supplementary role, in order to achieve ignition of the mixture. In this case the port provided in the wall portion is opened, that is to say exposed, to a greater or lesser width through adjustment of the shutoff element.

If the auto-ignition, that is to say the transfer of ignition gas for the purpose of auto-ignition, as already proposed above, is performed at high loads T, this also assists the initiation of auto-ignition by hot exhaust gases. On the one hand the ignition gas originating from the exhaust gas-delivering cylinder is hotter at higher loads than at low loads. On the other hand the basically high or higher pressure and temperature level at high loads creates good prerequisites for the initiation of auto-ignition in the exhaust gas-receiving cylinder.

In contrast to this the auto-ignition according to the disclosure is not suitable for low loads, since the onset of auto-ignition may be uncontrolled or entirely absent, so that incomplete combustion or misfiring and greater emissions of unburned hydrocarbons and carbon monoxide can occur. Consequently it may be advantageous to use spark-ignition at low loads.

Unlike the homogeneous-charge compression-ignition (HCCI) method, which is also referred to as the volume ignition method or as the controlled auto-ignition (CAI) method, known in the state of the art and in which the aim is a controlled auto-ignition of the homogenized fuel-air mixture, preferably concurrently throughout the entire cylinder or combustion chamber, in the internal combustion engine according to the disclosure the auto-ignition is initiated and locally confined by a limited quantity of hot exhaust gas, the ignition gas, as with a spark plug and in place of the spark plug. The maximum pressure and pressure gradient of the combustion are thereby limited compared to homogeneous auto-ignition and compression ignition is feasible for higher loads. It is to be assumed here is that the ignition gas originating from the exhaust gas-delivering cylinder does not mix completely with the fuel-air mixture present in the exhaust gas-receiving cylinder, but initiates the auto-ignition locally, and is to be regarded as the starting point for the combustion of the mixture.

The initiation of auto-ignition at high loads may render the spark-ignition dispensable at these loads, for which reason the high load-specific demands of the spark plug are no longer a problem, particularly the demand for a high ignition voltage at high loads, at which the internal combustion engine according to the disclosure is ignited by auto-ignition.

In addition the exhaust gas originating from the auto-ignition has a relatively low concentration of nitrogen oxides ($NO_x$) and virtually no soot, which has an advantageous effect on the emission characteristics of the internal combustion engine.

In connection with the transfer of exhaust gas from one cylinder of the internal combustion engine into another cylinder via the exhaust discharge system allowance may be made for the fact that in the charge cycle the cylinders of the internal combustion engine may have a reciprocal influence on one another in a variety of ways.

These effects are known and are basically regarded as disadvantageous. In particular shorter exhaust pipes may mean that the effect obtained by an ongoing residual gas scavenging is at least partially negated by the charge cycle of another cylinder. Thus in a four-cylinder in-line engine, the cylinders of which are operated with the firing order 1-3-4-2, the fourth cylinder, for example, may have a detrimental influence during the charge cycle on the third cylinder adjacent to it in the firing order, that is to say the previously ignited cylinder, and exhaust gas originating from the fourth cylinder may get into the third cylinder, before its exhaust valves close. The evacuation of the combustion gases from the fourth cylinder here is substantially based on two different mechanisms. When an exhaust valve opens at the beginning of the charge cycle, the combustion gases flow at high velocity through the exhaust port into the exhaust pipe, due to the high pressure level prevailing in the cylinder towards the end of combustion and due to the associated high pressure differential between the combustion chamber and the exhaust discharge system. This pressurized flow process is all the more pronounced the greater the load T and is accompanied by a high peak pressure, which is also referred to as a pre-exhaust surge and which travels along the exhaust pipe. In the further course of the charge cycle the pressures in the cylinder and in the exhaust pipe largely equate to one another, so that the combustion gases are now expelled due to the piston movement.

In order to counter this effect at low loads the opening period of the exhaust valves and the exhaust ports is curtailed, that is to say the exhaust is opened later or closed earlier. The shortened opening period of the exhaust valves, however, may have disadvantages with regard to the output at high engine speeds and loads.

In the internal combustion engine according to the disclosure the transfer of exhaust gas from one cylinder into another cylinder is not prevented but encouraged in order to utilize this exhaust gas for initiating auto-ignition at high loads. Accordingly, it may be advantageous according to the present disclosure to increase an opening duration of the at least one exhaust port of each cylinder in order to assist the transfer of exhaust gas serving as ignition gas.

The spark-ignition may be deactivated as soon as ignition shifts to auto-ignition and auto-ignition is induced by ignition gas. Nonetheless it may be advantageous to apply both ignition methods in parallel, thus undertaking spark-ignition also when initiating the auto-ignition.

In advantageous embodiments of the spark-ignition internal combustion engine each cylinder is equipped with a spark plug for initiating spark-ignition.

In advantageous embodiments of the spark-ignition internal combustion engine the electrode gap of each spark plug is here designed for low loads.

A spark plug serving for the initiation of spark-ignition may be designed with a large electrode gap, which ensures the reliable ignition of a less dense fuel-air mixture at low loads. As the load increases or with less dense mixtures auto-ignition is then activated, for which purpose, among other things, the port provided in the wall portion is opened for the transfer of exhaust gas.

As has already been explained, the aim during the charge cycle is for a rapid opening of the largest possible flow cross sections, in order to minimize the throttling losses in the exhaust gas outlet flows and to ensure an efficient discharge of the exhaust gases. For this reason it is advantageous to equip the cylinders with two or more exhaust ports.

In internal combustion engines, in which each cylinder comprises at least two exhaust ports for discharging the exhaust gases from the cylinder, advantageous embodiments of the spark-ignition internal combustion engine are those in which the exhaust port, which faces and is nearest to the succeeding cylinder in the firing order, has an earlier opening time, and the exhaust port, which is arranged remotely and further away from the succeeding cylinder in the firing order, has a later opening time.

In this respect this nearest exhaust port is the exhaust port suited to the transfer of exhaust gas, the function of which, namely the transfer of ignition gas, can be suitably assisted by opening this exhaust port earlier, thereby allowing more time for the exhaust gas transfer.

The other exhaust port, which is arranged remotely and further away from the succeeding cylinder in the firing order, may be opened later.

In internal combustion engines in which each cylinder comprises at least two exhaust ports for discharging the exhaust gases from the cylinder, advantageous embodiments of the spark-ignition internal combustion engine are those in which the exhaust port, which faces and is nearest to the preceding cylinder in the firing order, has a later closing time, and the exhaust port, which is arranged remotely and further away from the preceding cylinder in the firing order, has an earlier closing time.

This embodiment also advantageously assists the transfer of exhaust gas, that is to say ignition gas. In contrast to the embodiment previously described, however, the transfer of exhaust gas is not assisted by suitable valve timings of the exhaust ports of the exhaust gas-delivering cylinder, but rather by suitable valve timings of the exhaust ports of the exhaust gas-receiving cylinder. The improvement obtained, however, is based on the same effects, an exhaust port of the exhaust gas-receiving cylinder remaining open for longer, that is to say being closed later, in order to afford the ignition gas already present in the exhaust discharge system more time for the transfer.

In advantageous embodiments of the spark-ignition internal combustion engine at least one supercharging device is provided. The supercharging serves primarily for boosting the performance of the internal combustion engine. Here the air for the combustion process is compressed, so that a greater air mass can be fed to each cylinder per working cycle. This makes it possible to increase the fuel mass and hence the mean pressure. Supercharging is a suitable to increase the power output of an internal combustion engine for the same displacement, or of reducing the displacement for the same power output. In either case the supercharging leads to an increase in the power-to-volume ratio and to a more favorable power-to-weight ratio. For the same vehicle constraints the load population can thus be shifted towards higher loads, at which the specific fuel consumption is lower.

An exhaust turbocharger and/or a compressor, for example, may be used as supercharging device. An exhaust turbocharger comprises a compressor and a turbine, which are arranged on the same shaft. The hot exhaust gas flow is fed to the turbine and expands, releasing energy in the turbine, so that the shaft is set in rotation. The energy which the exhaust gas flow delivers to the turbine and ultimately to the shaft is used to drive the compressor, also arranged on the shaft. The compressor delivers and compresses the charge air fed to it, thereby supercharging the cylinders. Where necessary, charge-air cooling is provided, which serves to cool the compressed combustion air before it enters the cylinders.

Various measures can be taken to optimize the torque characteristic of a supercharged internal combustion engine, for example by designing the turbine with a small cross section and simultaneous exhaust gas blow-off, but in particular through the use of multiple exhaust turbochargers, the turbines of which are arranged in parallel or in series.

In advantageous embodiments of the spark-ignition internal combustion engine direct injection is provided for introducing fuel into the cylinders. The injection of fuel directly into the combustion chamber of the cylinder is regarded as a suitable measure for discernibly reducing the fuel consumption also on spark-ignition engines, for which reason the development of direct-injection spark-ignition engines has become increasing important.

The principle of direct injection is inherently associated with internal cooling of the combustion chamber and the mixture, thereby allowing higher compression and/or supercharging and consequently improved utilization of the fuel without knocking.

Direct injection of the fuel into the combustion chamber is suitable for achieving stratified charging of the combustion chamber, which likewise contributes to the dethrottling of the spark-ignition operating process, since with the aid of stratified-charge operation the internal combustion engine can be made to run very lean, which affords thermodynamic advantages particularly in partial-load operation, that is to say in the low and medium load range, when only small quantities of fuel are to be injected.

In internal combustion engines in which each exhaust port is equipped with an exhaust valve, which can be controlled by a valve actuating device and which opens or closes the exhaust port, advantageous embodiments are characterized in that the valve actuating device is of at least partially variable design for varying the valve timings, and the valve timings are varied according to whether a cylinder is an exhaust gas-delivering cylinder or an exhaust gas-receiving cylinder.

Figure 6:
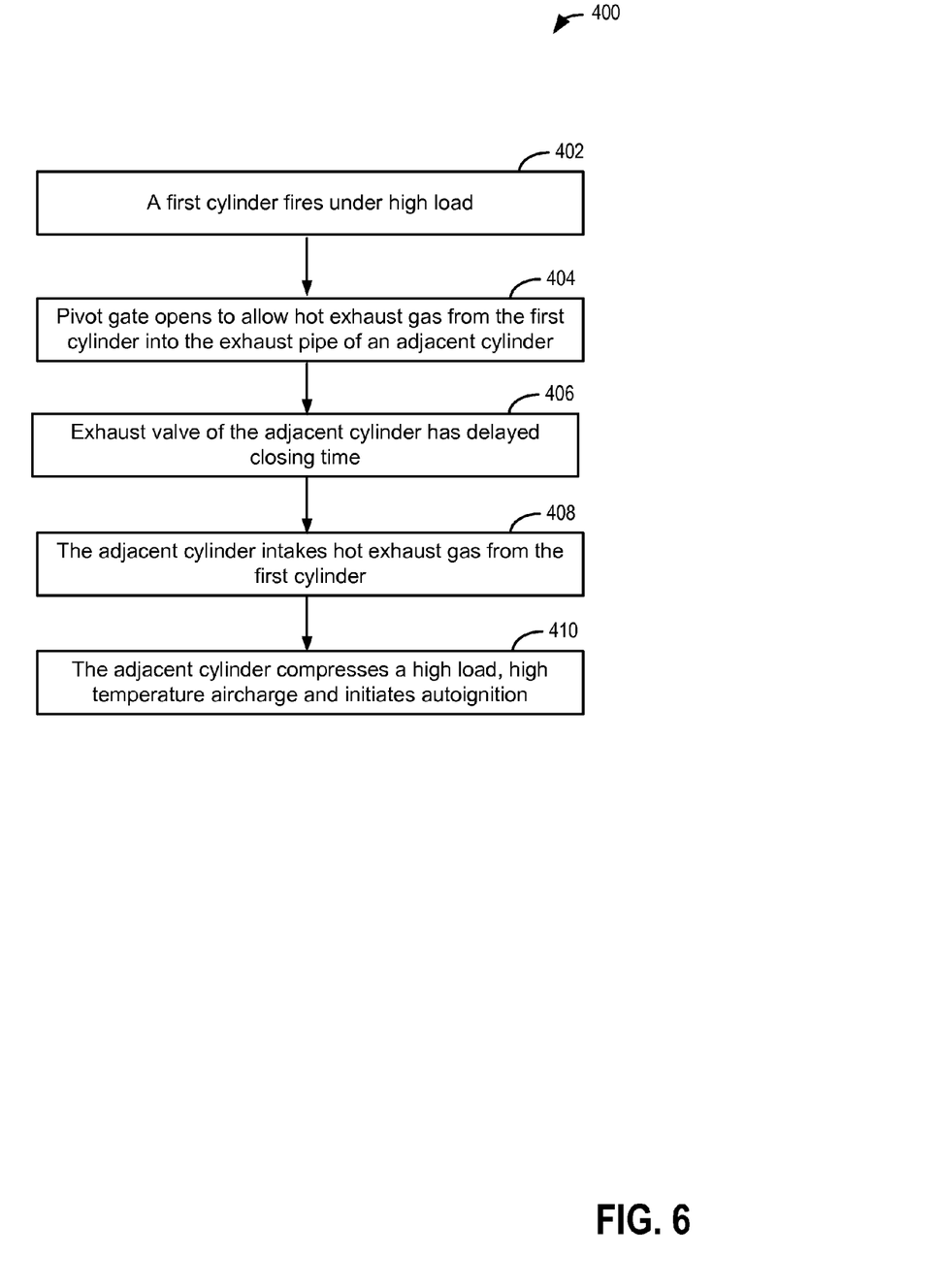
FIG. 6 shows the process flow for initiating spark via autoignition in two adjacent cylinders under high load.

Turning now to FIG. 6, a method 400 is shown depicting the process flow for initiating spark via autoignition in two adjacent cylinders under high load. The cylinders in question may be, as a non-limiting example, cylinders 3 and 4 of an inline 4 cylinder engine as described above, as these cylinders are situated next to one another and fire sequentially. Furthermore, the circumstances under which an engine according to the present disclosure is adjusted to undergo auto ignition are discussed in greater detail below in reference to FIG. 7.

At step 402, a first cylinder fires under high load. This first cylinder may, for example be the second or third cylinder of an inline four cylinder engine fired in a 1-3-4-2 firing order. In alternative embodiments, the first cylinder could be part of any engine with at least two cylinders wherein the first cylinder is next to an adjacent cylinder which fires immediately following the first cylinder in the firing order. Furthermore, the first cylinder may be adjusted, under high loads, such that positive valve overlap is increased to increase the temperature of intake air and the residual exhaust gas in a combustion chamber.

At step 404, the pivot gate opens to allow hot exhaust gas from the first cylinder into the exhaust pipe of the adjacent cylinder. In the example of an inline, four cylinder engine the adjacent cylinder may be the first or fourth cylinders. This pivot gate serves as an adjustable shut off element which opens and closes a port in the wall portion of an exhaust manifold separating the exhaust pipes of the at least two cylinders.

At step 406 the exhaust valve of the adjacent cylinder has a delayed closing time, allowing it to intake the hot exhaust gas released into the exhaust pipe via the pivot gate in the wall portion. The opening period of an exhaust port can be extended by closing the port later or in another example by opening the associated valve earlier. The extended opening period may on the one hand serve as a measure for allowing the process of transferring ignition gas to be initiated at all and in a departure from the normal operation of the internal combustion engine, that is to say a measure for starting the transfer. The extended opening period may however also serve as a measure used for improving the transfer of exhaust gas.

Extending the opening period of the exhaust ports serves to ensure that the exhaust strokes of the individual cylinders overlap or overlap to a greater degree in the course of the charge cycle. The transfer of exhaust gas serving as ignition gas from a first exhaust gas-delivering cylinder into a second exhaust gas-receiving cylinder is advantageously assisted.

In internal combustion engines in which each exhaust port is equipped with an exhaust valve, which can be controlled by an at least partially variable valve actuating device, advantageous embodiments are characterized in that the valve actuating device comprises at least two different cams for actuating the exhaust valve, at least the two different cams generating opening periods of different length of at least the one exhaust valve per cylinder.

This is advantageous with a view to the transfer of exhaust gas serving as ignition gas. In order to start, that is to say to allow the transfer of exhaust gas, or to assist, that is to say to improve or to facilitate the transfer of exhaust gas, it is advantageous to extend the opening period of at least the one exhaust port of each cylinder.

At step 408, hot intake gas is admitted into the adjacent combustion cylinder and mixed with the air-fuel mixture. Mixing with exhaust gases allows the aircharge to have a higher temperature than possible with intake air alone, or through traditional EGR. The higher temperature aids in initiation of autoignition.

At step 410, during the compression stroke of the adjacent cylinder the high density and temperature of the air-fuel mixture within the combustion cylinder result in autoignition. In some embodiments, as discussed above, it may be further possible to also use spark ignition in conjunction with the adjustment to the pivot gate allowing hot exhaust gas into the adjacent cylinder.

Figure 7:
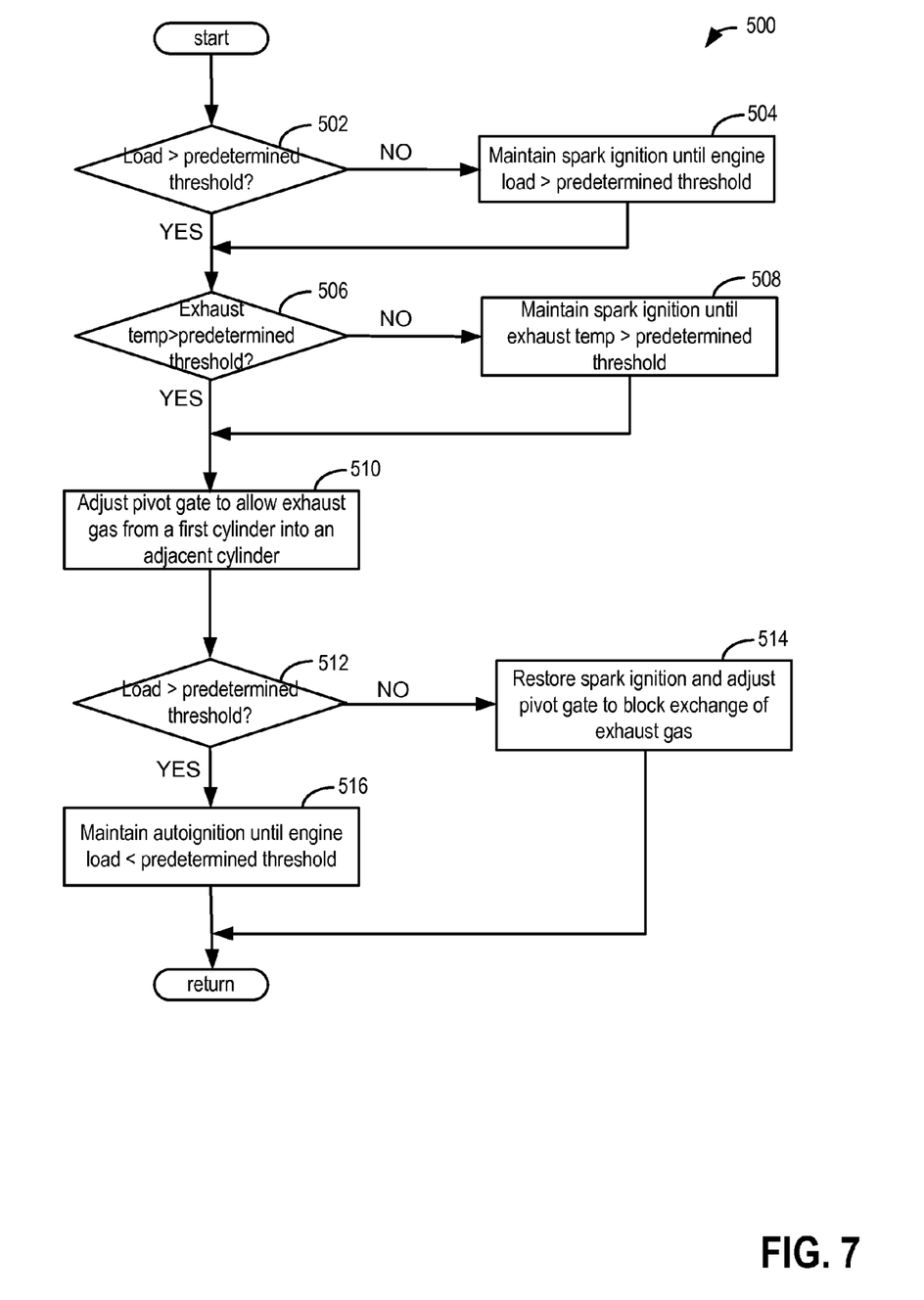
FIG. 7 shows a method depicting when an engine in accordance with the present disclosure is operated under spark ignition or autoignition.

Turning now to FIG. 7, a method 500 is shown depicting when an engine in accordance with the present disclosure is operated under spark ignition or autoignition conditions. The method 500 may be carried out by engine controller 12 and stored on ROM 110.

At step 502, it is determined if the load is greater than a predetermined threshold. The predetermined threshold may be $T>0.5\ T_{max}$ or $T>0.65\ T_{max}$ where T is the engine load, as non-limiting examples. The predetermined threshold for load may be based on a map such as the one shown in FIG. 5. If at 502, the engine load is not larger than the predetermined threshold (NO) the method proceeds to step 504 where spark ignition is maintained until the engine load exceeds the predetermined threshold.

If at step 502, the engine load exceeds the predetermined threshold the method proceeds to step 506 where it is determined if the exhaust temp is greater than a predetermined threshold. The predetermined threshold may be a temperature at which the exhaust gas may serve as an effective ignition starter. Exhaust gas temperature may be estimated based on engine load, air-fuel ratio, and engine speed for example or an exhaust gas temperature sensor may be arranged in exhaust passage 148. If the exhaust temperature is not greater than a predetermined threshold temperature, for example following a cold start, the method proceeds to 508 where spark ignition is maintained until the exhaust temperature is greater than the predetermined threshold.

If at step 506 the exhaust temperature is greater than a predetermined threshold (YES) the method proceeds to step 510 where the pivot gate, serving as an adjustable shutoff element, is adjusted to allow exhaust gas from a first cylinder into an adjacent cylinder, the adjacent cylinder following the first cylinder in the firing order. Allowing exhaust gas from the exhaust pipe of the first cylinder into the exhaust pipe of the second cylinder will result in the hot exhaust gas being taken into the combustion chamber and combined with the air-fuel mixture therein. The resultant higher temp, mixed with the high density of the aircharge within the cylinder will allow for autoignition upon compression.

At step 512, it is again determined if the engine load is greater than the predetermined threshold. If the engine load is below the predetermined threshold (NO) at step 512, the method proceeds to 514 where spark ignition is restored and the pivot gate is adjusted to block exhaust gas from permeating the port in the wall portion of the integrated exhaust manifold.

If at step 512, it is determined that the engine load is greater than the predetermined threshold (YES), then at 516 auto ignition is maintained and the pivot gate is positioned to allow exhaust gas from the first cylinder into the exhaust pipe of the adjacent cylinder until the load is not greater than the predetermined threshold. The method then returns.

It should be appreciated that the method may be adapted to accommodate any engine with at least two cylinders. Furthermore, in some circumstances the method may be adapted such that the pivot gate is adjusted to allow exhaust gas from a first cylinder into the adjacent cylinder to supply ignition gas, but spark ignition via the spark plug may still be used. This embodiment, may be used, for example, following a cold start when exhaust gases may not be high enough temperature to serve as ignition gas. Additionally, the pivot gate may be adjustable by degrees such that in some scenarios more or less exhaust gas may be permitted to enter the exhaust pipe of the adjacent cylinder. All of the above method variants are further compatible with a, twin scroll turbo, or additional system or treatment located in the exhaust gas system as discussed above.

The present application relates to ignition initiation under varied aircharge density and composition. An engine is disclosed comprising at least two cylinders with spark plugs therein; an integrated exhaust manifold, the integrated exhaust manifold having a wall portion and an adjustable shutoff element within the wall portion wherein the wall portion divides exhaust pipes of the at least two cylinders and the adjustable shutoff element allows exhaust gas from a first cylinder into an exhaust pipe of an adjacent cylinder. Hot exhaust gas may be taken into an adjacent cylinder serving as ignition gas and allowing the engine of the present disclosure to undergo spark ignition at low loads, or autoignition at high loads.

The actions in flowcharts and methods described herein may represent code stored in memory of the controller 12.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A spark-ignition internal combustion engine comprising:
   at least one cylinder head;
   a first outer cylinder, a second inner cylinder, a third inner cylinder, and a fourth outer cylinder, wherein each cylinder comprises at least one exhaust port;
   an exhaust discharge system;
   an exhaust pipe joined to each of the at least one exhaust ports wherein the exhaust pipes from the first and fourth outer cylinders join and the exhaust pipes from the second and third inner cylinders join separately from the exhaust pipes of the first and fourth outer cylinders, wherein the joined exhaust pipes unite in a common exhaust pipe forming an integrated exhaust manifold inside the at least one cylinder head;
   a wall portion which projects into the exhaust discharge system separating the joined exhaust pipes of the first and fourth outer cylinders and the joined exhaust pipes of the second and third inner cylinders over a predefined distance starting from the at least one exhaust ports; and
   at least one port within the wall portion which is equipped with an adjustable shutoff element which opens or closes the port so that with the port opened exhaust gas from an exhaust gas-delivering cylinder of one of the joined exhaust pipes serves as ignition gas and is introduced via the exhaust discharge system and the opened port into an exhaust gas-receiving cylinder of one of the other, separately joined exhaust pipes to induce auto-ignition.

2. The spark-ignition internal combustion engine as claimed in claim 1, wherein each of the cylinders are equipped with a spark plug for initiating spark-ignition, wherein an electrode gap of each spark plug is designed for low loads.

3. The spark-ignition internal combustion engine as claimed in claim 1, wherein the wall portion extends up to the outside of the at least one cylinder head.

4. The spark-ignition internal combustion engine as claimed in claim 1, wherein a succeeding cylinder in a firing order serves as the exhaust gas-delivering cylinder, which delivers exhaust gas serving as ignition gas, and a preceding cylinder in the firing order serves as the exhaust gas-receiving cylinder, into which the ignition gas is introduced.

5. The spark-ignition internal combustion engine as claimed in claim 1, wherein each of the cylinders further comprises at least two exhaust ports for discharging exhaust gases from the cylinder.

6. The spark-ignition internal combustion engine as claimed in claim 5, wherein the exhaust port which faces and is nearest to a succeeding cylinder in a firing order, has an earlier opening time, and the exhaust port, which is arranged remotely and further away from the succeeding cylinder in the firing order, has a later opening time.

7. The spark-ignition internal combustion engine as claimed in claim 5, wherein the exhaust port, which faces and is nearest to a preceding cylinder in a firing order, has a later closing time, and the exhaust port, which is arranged remotely and further away from the preceding cylinder in the firing order, has an earlier closing time.

8. The spark-ignition internal combustion engine as claimed in claim 1, further comprising an exhaust turbocharger.

9. The spark-ignition internal combustion engine as claimed in claim 1, further comprising a direct injector for introducing fuel into the cylinders.

10. The spark-ignition internal combustion engine as claimed in claim 4, further comprising an exhaust valve, which can be controlled by a valve actuating device and which opens or closes the exhaust port, wherein the valve actuating device is of at least partially variable design for varying valve timings and the valve timings are varied according to whether a cylinder is the exhaust gas-delivering cylinder or the exhaust gas-receiving cylinder, and wherein the valve actuating device comprises at least two different cams for actuating the exhaust valve, the at least two different cams generating opening periods of different length of at least one exhaust valve per cylinder.

11. A method, comprising:
    under low loads, adjusting an adjustable shutoff element within a wall portion of an integrated exhaust manifold dividing exhaust pipes of two adjacent cylinders comprising a first outer cylinder and a second inner cylinder, wherein the first outer cylinder is merged with a fourth outer cylinder, and the second inner cylinder is merged with a third inner cylinder, to be fully closed to block exhaust gas from flowing in between the two adjacent cylinders to maintain spark ignition; and
    under high loads, adjusting the adjustable shutoff element to be opened to flow exhaust gas serving as ignition gas in between the first outer and second inner cylinders while carrying out auto-ignition in at least one of the two cylinders, wherein exhaust gas from one cylinder is introduced via the adjustable shutoff element into the other cylinder to carry out auto-ignition.

12. The method as claimed in claim 11, wherein when the adjustable shut off element is fully closed exhaust gas is blocked from permeating a port in the wall portion separating the exhaust pipes.

13. The method as claimed in claim 12, wherein when the adjustable shut off element is opened exhaust gas flows from the first cylinder into an adjacent cylinder, the adjacent cylinder following the first cylinder in a firing order.

14. The method as claimed in claim 11, further comprising adjusting the adjustable shutoff element to be fully closed to maintain spark ignition when exhaust temperature is below a predetermined threshold.

15. The method as claimed in claim 11, further comprising adjusting the adjustable shutoff element to be opened to maintain auto-ignition when a load is greater than a predetermined threshold.

16. The method as claimed in claim 15, comprising allowing exhaust gas from the exhaust pipe of the first cylinder into the exhaust pipe of the second cylinder when the adjustable shutoff element is opened until the load is not greater than the predetermined threshold.

17. The method as claimed in claim 16, further comprising restoring spark ignition when the load is not greater than the predetermined threshold.

18. An engine, comprising:
   at least two cylinders with spark plugs therein, wherein the at least two cylinders comprise a first cylinder and a second cylinder;
   at least one cylinder head;
   exhaust pipes within the at least one cylinder head for discharging exhaust gases from the at least two cylinders, the exhaust pipes of cylinders with great angular ignition spacing merging in the cylinder head upstream of a turbocharger;
   a wall portion separating the exhaust pipes of cylinders with small angular ignition spacing, the wall portion downstream of the merged pipes; and
   an adjustable shutoff element within the wall portion, wherein the adjustable shutoff element within the wall portion facilitates cylinder cross talk between separated exhaust pipes of the first and second cylinders, and wherein exhaust gas from the first cylinder serving as ignition gas is introduced via the adjustable shutoff element into the second cylinder when the adjustable shutoff element is open.

19. The engine as claimed in claim 18, wherein the at least two cylinders comprise four cylinders.

\* \* \* \* \*